Dec. 11, 1928.
D. W. ROSS ET AL
1,694,563
METHOD OF MOLDING CERAMIC MATERIALS
Filed Feb. 2, 1927   3 Sheets-Sheet 1
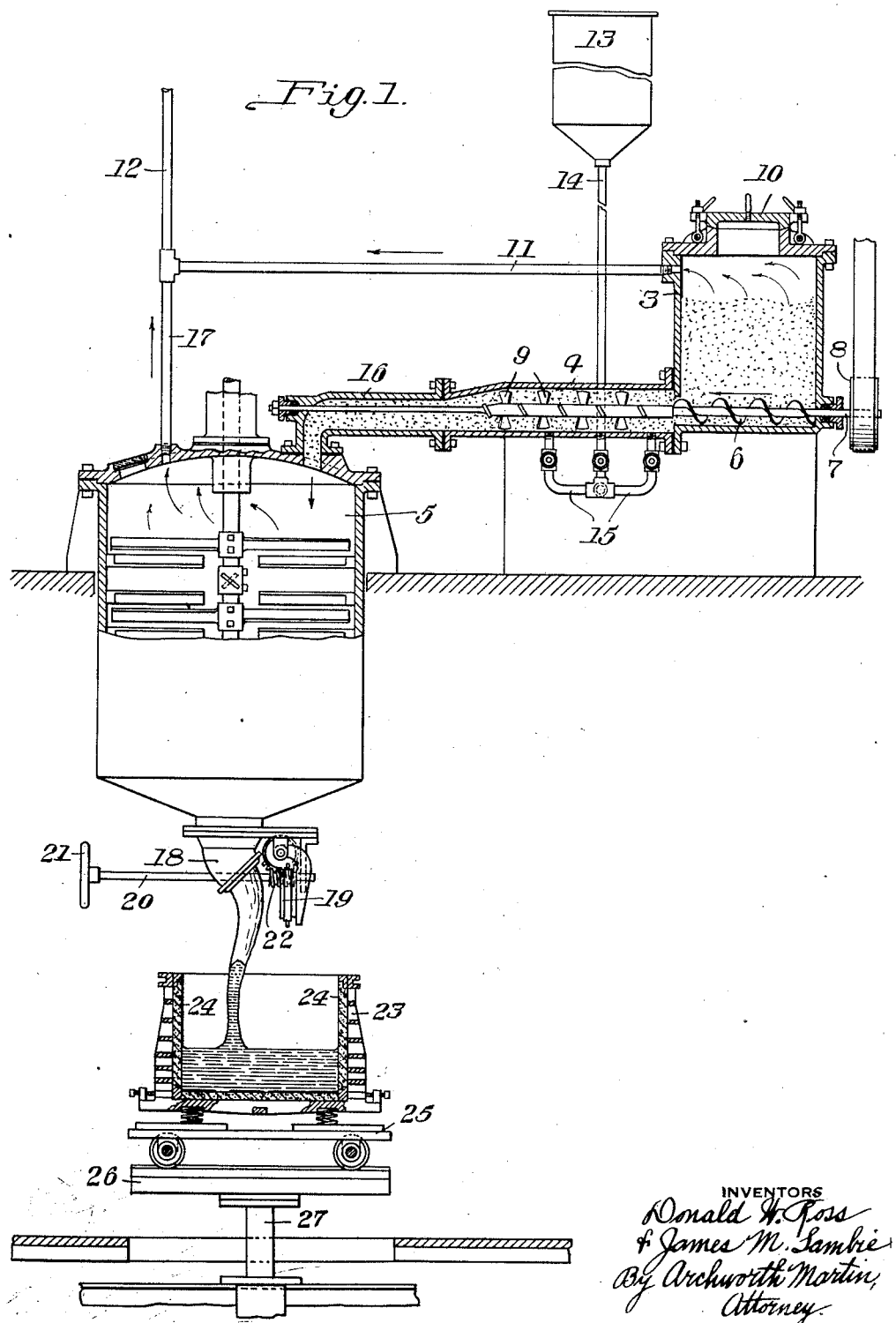

Dec. 11, 1928. 1,694,563
D. W. ROSS ET AL
METHOD OF MOLDING CERAMIC MATERIALS
Filed Feb. 2, 1927    3 Sheets-Sheet 2
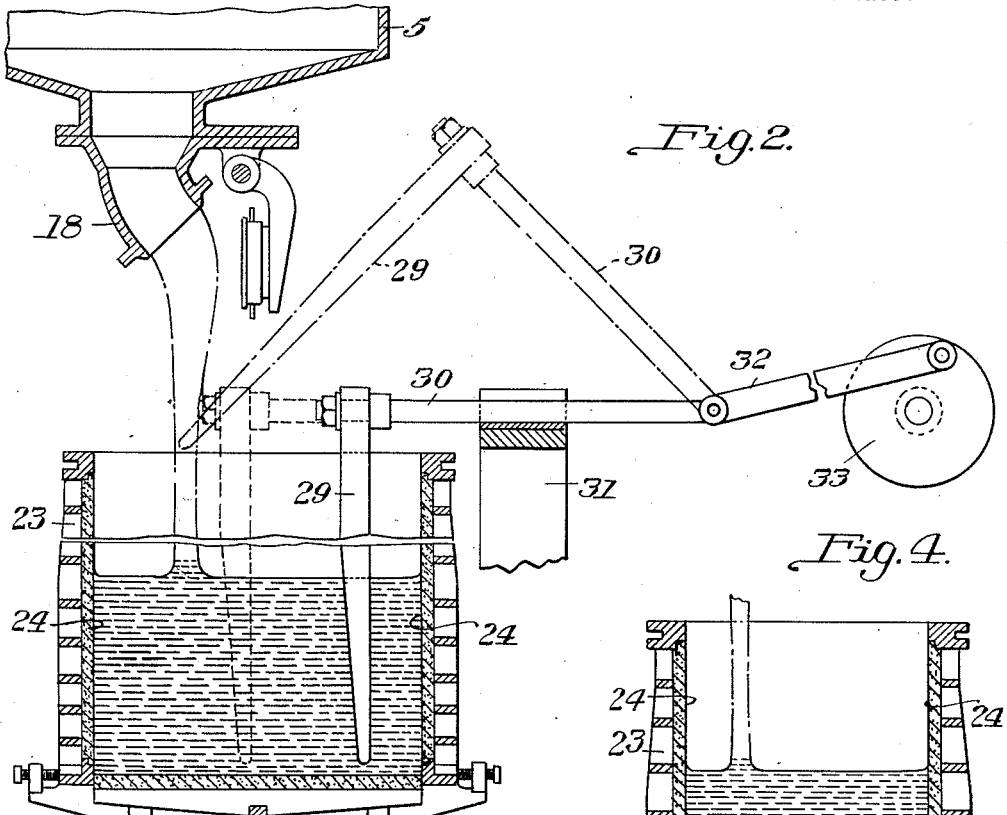
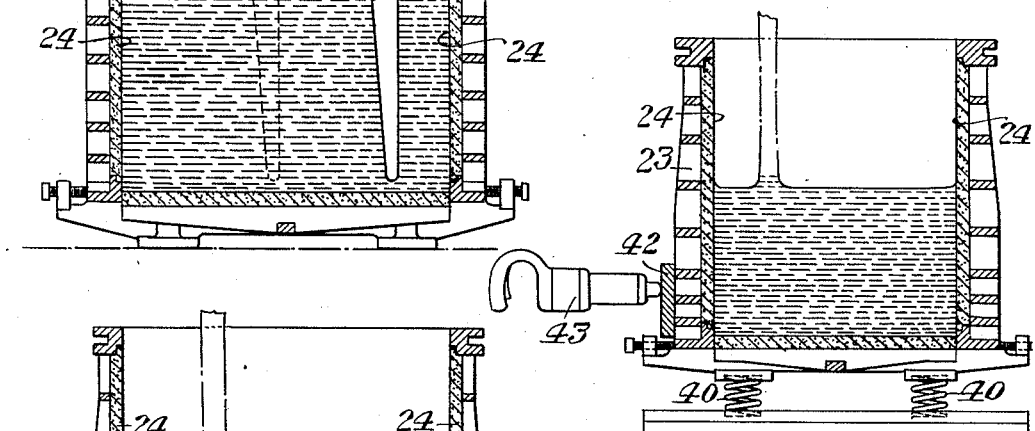
INVENTORS
Donald W. Ross
& James M. Lumbie
By Archworth Martin,
Attorney Dec. 11, 1928.                                                    1,694,563
D. W. ROSS ET AL
METHOD OF MOLDING CERAMIC MATERIALS
Filed Feb. 2, 1927         3 Sheets-Sheet 3
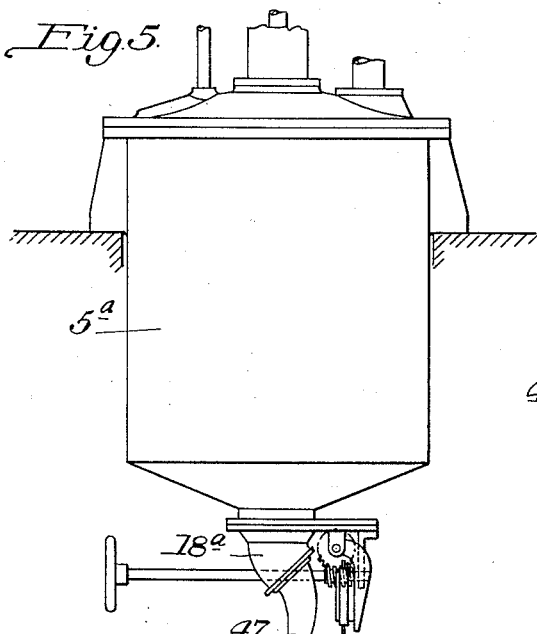
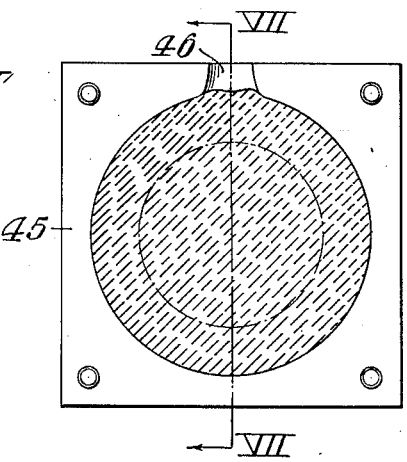
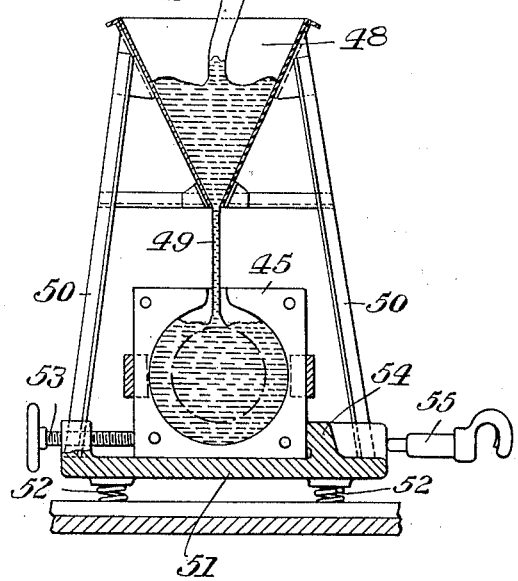
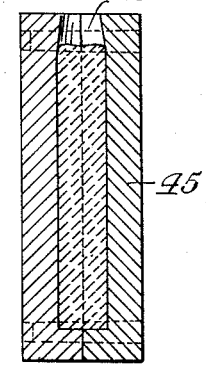
INVENTORS
Donald W. Ross
& James M. Lambie
By Archworth Martin,
Attorney.

Patented Dec. 11, 1928.

1,694,563

UNITED STATES PATENT OFFICE.

DONALD W. ROSS AND JAMES M. LAMBIE, OF WASHINGTON, PENNSYLVANIA.

METHOD OF MOLDING CERAMIC MATERIALS.

Application filed February 2, 1927. Serial No. 165,324.

Our invention relates to a method of molding ceramic wares, particularly cast ceramic wares, and more particularly cast refractory wares. The invention has for its principal objects the provision of an improved process, whereby:

(1) A smoother surface can be obtained on articles formed in molds, and especially in porous molds, than is the case in present practice;

(2) Materials of high viscosity can be satisfactorily molded in such molds;

(3) The particles of the materials will orient themselves into compact arrangement;

(4) The sealing in of air bubbles is prevented and the movement of air bubbles out of the body facilitated;

(5) Control of the thickness or diameter of a stream of plastic material is effected, during its movement toward a mold, and (6) To improve generally the methods of casting ware from various kinds of material.

For purposes of convenience and in order to more clearly bring out some of the various advantages of our invention, we hereinafter describe it as employed more particularly in connection with the casting of ceramic wares, in porous wall molds, but it will be understood that the method is of utility in manipulating casting materials other than ceramics, and the molds employed need not necessarily have porous walls.

When plastic or semi-fluid ceramic materials come into contact with porous walls of molds the portions in contact with the porous walls immediately begin losing water to the walls. In the case of stiff material or viscous casting slips of low water content a slight loss of water results in a stiffening of the surface in contact with the porous wall, after which further flowing of the material to form better contact with the surface is greatly impeded.

The surface of a body of viscous casting slip, particularly such slips as contain coarse grog is usually rough before coming into contact with the porous walls. In present day practice the rough surface of the clay in coming into contact with the mold wall loses water so rapidly that the surface becomes stiff before the clay has had time to conform perfectly to the wall, with the result that surfaces of the molded ware are rough and uneven. Again certain portions of such viscous slips may temporarily come into contact with molding surfaces and later the clay surface formed may move as the slip flows and more completely fills the mold. Such movement frequently tends to form wrinkles on the surface of the molded pieces.

If during the filling of porous molds with viscous slip, the molds or the contained slip, or both be vibrated, shaken or jarred, the slip completely fills the molds and conforms perfectly to the walls thereof. Even after the molded surface of the slip has been somewhat stiffened through loss of moisture, to the mold wall, this surface can still be made to conform substantially perfectly to the mold wall by vibration, shaking or jarring, providing of course that the surface has not become too stiff.

This vibrating of the molds permits a coarse grained viscous slip to flow into narrow places, thereby enabling us to make intricate shapes.

In previous practice it has been necessary to have a large sprue which acts as a storage reservoir to supply new clay to the interior as the piece sets, or to hold one side of the block moist by the use of a water-impervious covering, so that all distortion due to drying shrinkage could take place on that side.

By employing slips of very high viscosity and low water content, we are able to make shapes, no side of which in drying is greatly distorted, but which remains reasonably true to the shapes of the mold because low-water slips of high viscosity do not flow so readily as to cause the wrinkles or folds mentioned above. By vibrating the mold, either while it is being filled or immediately thereafter, or both, we cause the clay to flow into intimate contact with the porous walls, so that the piece being cast takes exactly the shape of the mold.

We further find that if the stream in filling should fold so as to entrap an air bubble, the vibration causes the clay to spread, the bubble to break and the air to be released. The orienting movements of the clay particles, due to vibration, causes them to enter into intimate contact with one another and causes air to be forced out of pockets and to the surface where its escapes.

We accomplish this vibration by use of a commercial small electric vibrator, or a pneumatic vibrator clamped to the molds, if the molds are small, or by placing the mold on a platform which we vibrate or by the use of a commercial foundry jarring machine, such as those termed "jolt rammers."

Some of the forms of apparatus by means of which our invention may be practiced are shown in the accompanying drawing, wherein Figure 1 is a view, partially in elevation and partially in section, showing a mixing and casting system; Fig. 2 is a view, on an enlarged scale, showing one manner in which the material may be agitated while being introduced into a mold; Fig. 3 is a view showing one manner in which a mold may be agitated; Fig. 4 shows a modified form of a mold-agitating apparatus; Fig. 5 shows a manner in which the thickness of a stream of material may be reduced, to permit it to enter a relatively small sprue or mold opening; Fig. 6 is a view, on an enlarged scale, of the mold of Fig. 5, and Fig. 7 is a view taken on the line VII—VII of Fig. 6.

The mixing apparatus, as shown in Fig. 1 is described and claimed in our copending application, Serial No. 136,259, filed September 18, 1926, and forms no part of the present invention.

The apparatus shown in Figure 1 comprises a bin 3 for receiving dry material, such, for example, as clay and grog grains. 4 is a preliminary mixing chamber and 5 is a vacuum chamber wherein the final mixing of the materials takes place.

The bin 3 may have a body portion of cylindrical form and a bottom of wedge-like form. A feed screw 6 is disposed in the bottom of the bin 3 and is secured to a shaft 7 that is driven by the pulley 8 from any convenient source of power. Blades, vanes, or a screw 9 are secured to the shaft 7, for the purpose of mixing the dry and liquid ingredients as hereinafter explained. Stuffing boxes are provided for the shaft 7 so as to exclude air from the chamber 4.

In operating the apparatus, the dry materials are introduced into the bin 3 through an opening in the top thereof which is then tightly sealed by a cover plate 10. A partial vacuum is then created within the bin 3 by extracting air through pipes 11 and 12 that are connected to a suitable suction pump (not shown). The feed screw 6 is rotated to advance the dry material from the bin 3 to the chamber 4. Usually the dry material is sufficiently loose to permit extraction of the air therefrom without the addition of agitating means other than the screw 6.

As the dry material enters the chamber 4 and is being agitated, we introduce the desired liquid ingredients, which may be water and deflocculating agents, or other suitable materials that are supplied from a tank 13 through a pipe 14 and its valve-controlled branches 15 that communicate with the chamber 4 at longitudinally-spaced points, in order to effect a better distribution of the liquid.

The blades 9 gradually mix the liquid and dry material and advance the mixture through a channel 16 into the mixing chamber or blunger 5 where the materials are more completely mixed. Air is extracted from the chamber 5 through a pipe 17 connected to the the vacuum pipe 12.

When mixing of the materials has been completed within the blunger 5, such mixture is withdrawn therefrom through a discharge outlet 18 that is closed by a valve 19, that is operated by a shaft 20 and a hand wheel 21, the shaft 20 having worm gear connection 22 with the valve.

The material enters a mold 23 that has lining sheets 24 preferably of porous material such as plaster of Paris, plaster board, or the like, as described in our application, Serial No. 1593, filed January 10, 1925, which has become Patent No. 1,625,947. The mold is mounted upon a truck 25 that is in turn supported upon a table 26 that is raised and lowered by means of a fluid pressure plunger 27. The plunger 27 may be actuated in any usual manner, through suitable connections. At the commencement of the mold-filling operation, the plunger 27 is in elevated position so that the material will not have such great distance to fall that it will tend to lap or form folds with consequent entrapment of air. As the filling progresses, the mold is gradually lowered away from the spout 18, and during this lowering operation, we agitate the material in the mold or vibrate the mold in a manner to be hereinafter described. The step of lowering the mold may be dispensed with under certain conditions, the primary feature of the present invention residing in the vibration of the material or the mold, or both.

Referring now to Fig. 2, we show material discharging from the blunger 5, through the spout 18, and into the mold 23. During filling of the mold, the material is agitated by means of a paddle-like member 29 that is secured to the end of a rod 30 which is slidably mounted in a slot in the upper end of an upright 31. The rear end of the rod 30 has pivotal connection with an eccentric arm 32 which is driven by an eccentric member 33 from any suitable source of power (not shown). With the paddle 29 extending into the mold, as indicated in full lines, reciprocation of the rod 30 will move the paddle back and forth within the mold, to so agitate the material as to effect relative movement of the various particles thereof as heretofore explained at length. The paddle will be so disposed that it will not intercept the flow of the material into the mold. When the mold has become filled to the desired height, the paddle may be swung upwardly out of the mold, as indicated in the upper dotted lines.

It will be understood that the member 29 instead of being reciprocated over a considerable distance within the mold, may be given rapid reciprocatory movement through a relatively short distance, in order to effect an agitation or vibration of the mixture.

Referring now to Fig. 3, we show a supporting framework 35 that has bearings for a shaft 36, which is driven by a pulley 37 from any suitable source of power. Cam discs 37ª are secured to the shaft 36. In practice, we will probably provide a shaft 36 and cams 37ª adjacent to each end of the mold 23. The cams 37ª are shown as having their high points uppermost, supporting the mold 23 in elevated position. Further movement of the shaft 36 will permit the mold to fall and impact upon the upper surface of the supports 35, thus jarring and settling the material within the mold. Guide pins 38 are secured to the mold and project into guide slots in the supports 35, to hold the mold centralized with respect to the supports.

In Fig. 4, we show the mold 23 as supported upon coil springs 40. Only two springs are shown, but four or more will probably be provided. An anvil plate 42 is provided at one side of the mold so that impacts from a power hammer 43 may be imparted to the mold to jar the same, the springs 40 permitting of the necessary lateral movement. The hammer 43 may be of either the electrically or pneumatically operated types.

By the foregoing process, we are enabled to mold good castings of ceramic slips containing less than 12% of water, whereas, it has heretofore been thought necessary to have a minimum water content of from 15% to 20% in making cast ware. The casting of refractory wares from slips having such large water content has been unsatisfactory because of the great amount of drying shrinkage and interstitial space resulting from evaporation of the water content.

The less water we are enabled to employ in the slip and still permit it to flow and unite with other portions of such slip, the less shrinkage occurs in drying, with consequently smaller distortion. The use of this stiff or viscous casting slip takes the form of a new industry, allowing us to make shapes by this process which would be impossible with the high shrinkage and distortion caused by former practice. Such slips are not readily castable and can only be handled by keeping them in motion until they have assumed form within the mold. As an example of the stiffness of such slips or pastes, we find that as long as the blunger in which such a slip is being mixed is kept in motion, the paste will flow, but should the blunger stop for a few moments for any reason, the paste sets so, through setting of the grog particles, that it is impossible to start the machine again. Another explanation for this setting of such mixtures is given, however, in the Journal of the American Ceramic Society, vol. 10, No. 11, November 1927, page 924. This effect is there described as the phenomenon of coagulation of colloidal clay sol on cessation of agitation, which coagulated material can again be broken up into sol by sufficient agitation. This property of colloidal materials is known as thixotropy. It is necessary to keep the paste in motion until it has flowed into all parts of the mold.

In practicing the process as herein described, it is desirable to employ a deflocculated clay because it flows or moves more freely than the mixtures containing undeflocculated clay, since the particles composing the mixture slide upon one another more readily.

The employment of a casting slip which has low water content further enables us to cast a body that will not be distorted or contain pockets or depressions by reason of shrinkage from an excess of water which may have accumulated in a particular portion of the block. It is, therefore, not necessary for us to provide a large sprue or reservoir to hold a surplus quantity of the mixture to be fed down by gravity, for the purpose of filling the voids which would otherwise be left upon drying out of the water.

In order to secure a slip of low water content, we employ a mixture consisting of approximately 20% deflocculatable clay, together with graded grog, of which a substantial percentage is so finely ground that the slip will be suitably mobile when water and deflocculating agents, such as described in our copending application, Serial No. 744,059, filed October 16, 1924, are added thereto, a smaller percentage of water being required than would be the case if no substantial quantity of fines or deflocculating agents were employed.

Not only are we enabled to successfully make ceramic ware of great density, but the surfaces of the ware are of such smoothness of texture as to largely eliminate the necessity of grinding the surfaces to a desired smoothness.

In Figs. 5 to 7, we disclose means whereby a relatively thick stream of material may be reduced in thickness or diameter, so that it may readily enter a small sprue opening. In the arrangement shown in Figs. 1 to 4, the mixture is introduced into open-top molds and there is therefore no especial limit to the thickness of stream which may enter the mold. In the case of smaller ware than tank blocks, it is sometimes necessary to provide molds having sprue openings of small diameter through which the ceramic material may be introduced into the mold. For convenience of illustration, we have shown a split mold 45 provided with a sprue opening 46 through which the plastic material may enter to fill the mold. A stream of material 47 flows from the spout 18ª of the blunger 5ª into a hopper or funnel-like member 48, which has an opening in its lower end of much less diameter than the thickness of the stream 47, with the result that a small stream 49 will flow from the hopper 48 into the mold 45.

In order to prevent setting of the material in the funnel 48, we support such funnel on uprights 50 which are mounted upon a mold board or base 51, that is in turn yieldably supported by springs 52. The mold 45 is clamped between a screw 53 and a stop block 54 to hold it rigidly in position upon the base 51. Actuation of a rapping device 55 will vibrate the mold and also the funnel 48, so that the material, from the time it leaves the spout 18 until it assumes final form within the mold 45, is not permitted to become quiescent.

While we hereinafter claim the step of "vibrating" the casting material, it is to be understood that we employ the term in its broad sense, to include either the agitation of the material directly as in Fig. 2, or as agitated indirectly in Figs. 3 and 4.

We claim as our invention:—

1. The method which comprises introducing deflocculated plastic ceramic material into a mold and simultaneously vibrating the material.

2. The method which comprises introducing plastice ceramic material into a mold having moisture-absorbing walls and vibrating the material before it has become hardened.

3. The method which comprises introducing plastic ceramic material into a mold from a given source, increasing the distance between the mold and said source, and vibrating the material, simultaneously with the introduction thereof into the mold.

4. The method which comprises agitating a mass of ceramic casting material within a container, simultaneously discharging said material from said container into a mold, and agitating the material within the mold during the mold-filling operation.

5. The method of molding ceramic bodies, which comprises introducing plastic ceramic material into a mold and maintaining such material constantly flowing until it assumes a final shape conforming to the interior of the mold.

6. The method which comprises mixing ceramic materials to form a plastic mass, and introducing said mass into a mold, the mass being kept constantly flowing from the time of mixing until it has assumed form within the mold.

7. The method of molding ceramic material which comprises directing a stream of material toward a mold, reducing the diameter of said stream intermediate its source and its point of introduction into the mold, and vibrating said stream simultaneously with the reduction in diameter thereof.

8. The method of molding ceramic material, which comprises vibrating a deflocculated clay mix in a mold while still plastic.

9. The method of molding ceramic casting material, which comprises flowing a ceramic slip into a mold and retarding setting thereof by agitating the slip until it has assumed its final shape conforming to the interior of the mold.

10. The method of molding ceramic bodies which comprises flowing into a mold a deflocculated casting slip of such composition that it will cease flowing when not subjected to agitation, and continuously agitating such slip until it has assumed its final shape conforming to the interior of the mold.

11. The method of molding ceramic material which comprises directing a stream of material toward a mold, reducing the diameter of said stream intermediate its source and its point of introduction into the mold, and vibrating said stream simultaneously with the reduction in diameter thereof, and during the shaping thereof in the mold.

12. The method of molding ceramic casting materials, which comprises flowing a ceramic slip into a porous walled mold and retarding setting thereof by vibrating the mold until the slip has assumed its final shape conforming to the interior of the mold.

13. The method of molding ceramic bodies, which comprises flowing into a porous walled mold a deflocculated ceramic mass and retarding setting thereof by vibrating the mold until the mass has assumed its final shape conforming to the interior of the mold.

In testimony whereof we, the said DONALD W. ROSS and JAMES M. LAMBIE, have hereunto set our hands.

DONALD W. ROSS.
JAMES M. LAMBIE.